Patented Aug. 25, 1953

2,650,232

UNITED STATES PATENT OFFICE 2,650,232

2-METHYL-3-AMINO-4,5-DI-HYDROXY-METHYLPYRIDINE AND ITS SALTS AND THE PREPARATION THEREOF

Reuben G. Jones, Indianapolis, Ind., assignor to Eli Lilly and Company, Indianapolis, Ind., a corporation of Indiana No Drawing. Application October 21, 1950, Serial No. 191,510

6 Claims. (Cl. 260—296)

1

This is a continuation-in-part of U. S. patent application Serial No. 151,547, filed March 23, 1950.

This invention relates to a new base, 2-methyl-3-amino-4,5-di-hydroxymethylpyridine, to acid addition salts thereof, and to their preparation.

2-methyl-3-amino-4,5-di-hydroxymethylpyridine can be represented by the following formula:

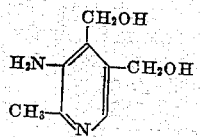

The above illustrated pyridinedicarbinol base contains two basic nitrogen atoms, and hence can react with one or two equivalents of acid to form monoacid or diacid salts. It is probable that in monoacid salts the acid is chiefly, if not exclusively, associated with the nitrogen of the amino group. Thus the monoacid salt can be represented by the following formula:

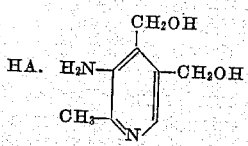

The diacid salt can be represented by the following formula:

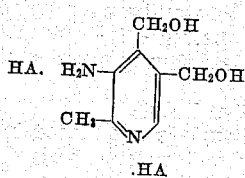

In each of the above formulas, HA represents one equivalent of an acid.

2-methyl-3-amino-4,5-di-hydroxymethylpyridine and its salts are useful as intermediates in the synthesis of pyridoxine (vitamin B6), since by simple treatment with nitrous acid they are readily converted to pyridoxine. A further field of utility arises from the surprising ability of the compounds to serve as antagonists to pyridoxine.

2-methyl-3-amino-4,5-di-hydroxymethylpyridine is readily prepared by reducing with lithium aluminum hydride a 2-methyl-3-aminopyridine having carboxyester groups in the 4 and 5 positions. Compounds suitable for the preparation of 2-methyl-3-amino-4,5-di-hydroxymethylpyridine and its salts are represented by the following formula

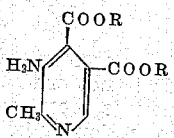

in which R is an esterifying radical. Compounds corresponding to the above formula are known to the art or are easily prepared from known compounds. For example, 2-methyl-3-amino-4,5-dicarboxypyridine is a known compound, and is readily esterified by commonly used, simple esterification processes to yield a diester suitable for use as a starting material for the compounds of this invention. For the purposes of this invention the character of the esterifying radical is of minor importance, and as will be understood by those skilled in the art, the esterifying radical can be any of a great number of esterifying radicals. Obviously, the esterifying radical employed should not contain groups which would substantially interfere with the reduction reaction. For reasons of availability, and because of their inability to interfere with the lithium aluminum hydride reduction, I prefer to employ esterifying radicals which are alkyl radicals, and particularly the lower alkyl radicals such as the methyl and ethyl radicals.

The general procedure for preparing 2-methyl-3-amino-4,5-di-hydroxymethylpyridine from an ester of 2-methyl-3-amino-4,5-dicarboxypyridine is as follows:

Lithium aluminum hydride is dissolved in the inert solvent such as is known to be suitable for carrying out lithium aluminum hydride reduction, e. g. ethyl ether, dioxan, dibutyl ether, tetrahydro furan, N-ethyl morpholine, and the like. This solution is mixed with the 2-methyl-3-amino-4,5-pyridinedicarboxy ester to be reduced. Preferably the dicarboxyester is added to the lithium aluminum hydride solution and is added slowly to prevent too violent a reaction since the reaction is exothermic. The pyridinedicarboxyester can be added as a dry solid, or more conveniently, can be added in the form of a suspension or solution in a solvent of the character described above. After all of the pyridinedicarboxyester has been added and is completely reduced, the 2-methyl-3-amino-4,5-di-hydroxymethylpyridine which is produced is recovered from the reaction mixture by conventional methods. Thus, for example, a small amount of water is added to the reaction mixture to decompose and precipitate excess lithium aluminum hydride and the lithium and aluminum complexes formed during the reaction, and the precipitated lithium and aluminum compounds are filtered off. The 2-methyl-3-amino-4,5-di-hydroxymethylpyridine is recovered from the filtrate by the usual evaporation, precipitation or extraction procedures.

Acid addition salts of 2-methyl-3-amino-4,5-di-hydroxymethyl-pyridine are prepared by conventional methods, as by adding one or two equivalents of an acid to a solution of the substituted pyridinedicarbinol base. As will be recognized by the art, many acids will react to form acid addition salts. It will be obvious, however, that employment of the salts in living organisms for "anti-pyridoxine" purposes will require the employment of relatively non-toxic salts having a degree of water-solubility. Examples of suitable acids for salt-forming purposes include hydrochloric, hydrobromic, phosphoric, nitric, citric, maleic, fumaric and tartaric acids and the like.

For carrying out the reduction process, a stoichiometric amount of lithium aluminum hydride can be employed, but preferably an excess is used to insure complete reduction of the pyridinedicarboxy ester. The amount of excess lithium aluminum hydride is not critical, and an excess of 100 percent or more occasions no difficulty in carrying out the reaction or in isolating the reduction product.

The following specific examples further illustrate the preparation of the compounds of this invention.

Example 1

23 g. of 2-methyl-3-amino-4,5-pyridinedicarboxylic acid [prepared according to the method of Itiba and Emoto, Sci. Papers Inst. Phys. Chem. Research (Tokyo) 38, 347, 1941] were dissolved in 50 cc. of methanol and the solution was treated with an excess of diazomethane dissolved in 700 cc. of ether. The mixture was allowed to stand at room temperature for 30 minutes, and the methanol, ether and excess diazomethane were distilled off. A white solid, consisting of dimethyl 2-methyl-3-amino-4,5-pyridinedicarboxylate, melting at about 94–95° C., remained as a residue. Analysis showed the presence of 12.45 percent of nitrogen as compared with the calculated value of 12.50 percent.

15 g. of dimethyl 2-methyl-3-amino-4,5-pyridinedicarboxylate were placed in the thimble of a Soxhlet extractor, and in the flask below the extractor was placed a solution of 9 g. of lithium aluminum hydride in 600 cc. of anhydrous ether. The ethereal solution in the flask was refluxed at such a rate as to extract the ester into the lithium aluminum hydride solution during a period of about one half hour. The reaction mixture in the flask was then cooled and was treated with 30 cc. of methanol to destroy excess lithium aluminum hydride. 30 cc. of water were added to the reaction mixture, whereupon a white solid, consisting of lithium and aluminum compounds, was formed. The precipitate was filtered off and extracted with 500 cc. of hot methanol to recover any of the pyridinedicarbinol entrained in the precipitate. The methanol extract was combined with the filtrate, and the mixture was saturated with carbon dioxide and evaporated to dryness in vacuo. The residue which contained 2-methyl-3-amino-4,5-dihydroxymethylpyridine and some aluminum and lithium carbonates, was extracted with 500 cc. of hot absolute ethanol. The ethanol extract was filtered to remove traces of the inorganic salts, and was evaporated to dryness in vacuo, whereupon crystals of 2-methyl-3-amino-4,5-dihydroxymethylpyridine were formed. These, on recrystallization from ethyl acetate and air drying, melted at about 141.5–142° C. 10.0 g. of 2-methyl - 3 - amino - 4,5 - di - hydroxymethylpyridine were recovered, a yield of about 90 percent of theory.

Analysis showed the presence of 56.95 percent of carbon and 7.21 percent of hydrogen as compared with the calculated amounts of 57.12 percent of carbon and 7.19 percent of hydrogen.

A solution of 2 g. of 2-methyl-3-amino-4,5-di-hydroxymethylpyridine in 40 cc. of 2N sulfuric acid was heated to about 70 to 80° C., and a solution of 2 g. of sodium nitrite in 10 cc. of water was added dropwise with stirring during a period of 10 minutes. The reaction mixture was kept at 70–80° C. for an additional period of 15 minutes, and was then cooled and adjusted to about pH 7 by the addition of 10 percent aqueous sodium carbonate. The resulting solution was evaporated to dryness in vacuo and the solid residue was extracted with 300 cc. of boiling acetone. The acetone extract was evaporated in vacuo, leaving a syrup which readily crystallized. The crystalline material, comprising crude pyridoxine, was dried, and the dry material was dissolved in a minimum amount of hot acetone. The acetone solution was chilled to −30° C. for five minutes, whereupon gum-like impurities precipitated. The acetone solution was decanted from the impurities and was evaporated to dryness in vacuo. 1.9 g. of white, crystalline pyridoxine melting at 152–153° C. were obtained. This amount corresponded to a yield of about 95 percent of theory.

Example 2

A mixture of 5 g. of 2-methyl-3-amino-4,5-pyridine-dicarboxylic acid and 100 cc. of n-butanol was saturated with dry hydrogen chloride. The resulting mixture was refluxed for 20 hours. The mixture was evaporated in vacuo, and the residue, comprising di-n-butyl 2-methyl-3-amino-4,5-pyridinedicarboxylate hydrochloride, was treated with an excess of aqueous 10 percent sodium bicarbonate solution. The dibutyl ester was extracted with ethyl acetate and the ethyl acetate extract was separated, dried over anhydrous magnesium sulfate, and evaporated to dryness in vacuo. A syrupy residue of the dibutyl ester was obtained, which gradually crystallized when allowed to stand under petroleum ether. Di-n-butyl 2 - methyl - 3 - amino - 4,5 - pyridine-dicarboxylate thus prepared melted at about 112–114° C.

1 g. of di-n-butyl 2-methyl-3-amino-4,5-pyridine-dicarboxylate was placed in the thimble of a Soxhlet extractor and extracted into a solution of 1 g. of lithium aluminum hydride in 100 cc. of anhydrous ether over a period of one half hour, by the procedure described in Example 1. The reaction mixture was treated as described in Example 2 to recover the 2-methyl - 3 - amino - 4,5 - di - hydroxymethylpyridine formed in the reaction. A yield of 0.4 g. or 73 percent of theory was obtained.

Example 3

1.3 g. of dibenzyl 2-methyl-3-amino-4,5-pyridine-dicarboxylate, prepared by the reaction of 2-methyl-3-amino-4,5-pyridinedicarboxylic acid with phenyldiazomethane, were dissolved in 50 cc. of dry ether. The solution was slowly added to a solution of 1 g. of lithium aluminum hydride in 200 cc. of anhydrous ether, under reflux. The resulting solution was treated according to the method of Example 2, to recover the 2-methyl-3-amino-4,5-di-hydroxymethyl-pyridine formed in the reaction. 0.15 g., a yield of 26 percent of theory, of 2-methyl-3-amino-4,5-di-hydroxymethylpyridine, melting at 141–142° C. were recovered. The low yield obtained resulted in part from mechanical losses occurring during the purification.

*Example 4*

0.17 g. (0.001 mol) of 2-methyl-3-amino-4,5-di-hydroxymethylpyridine were dissolved in 5 cc. of cold absolute ethanol, and to the solution was added a solution of about 0.05 g. (0.0005 mol) of concentrated sulfuric acid dissolved in 5 cc. of cold absolute ethanol. An immediate precipitate of crystalline 2-methyl-3-amino-4,5-di-hydroxyethylpyridine sulfate separated. The precipitate was filtered off and dried in air. It melted with decomposition at about 218–219° C.

The oxalate and tartrate salts melting with decomposition, respectively at about 202–203° C. and 125–130° C., were prepared in the same manner as the sulfate salt.

The dihydrochloride and dihydrobromide salts were prepared by passing an excess of the hydrohalide gas into a cold absolute ethanol solution of 2-methyl-3-amino-4,5-di-hydroxyethylpyridine, and filtering and drying the crystalline salt which precipitated. The dihydrochloride salt melted with decomposition at about 174–175° C., and the dihydrobromide salt melted with decomposition at about 156–157° C.

I claim:

1. A member of the group consisting of a base and its acid addition salts, said base being represented by the following formula

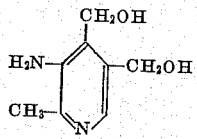

2. 2-methyl-3-amino-4,5-di-hydroxymethyl-pyridine represented by the formula

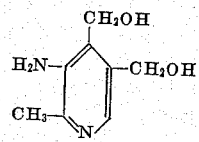

3. 2-methyl-3-amino-4,5-di-hydroxymethyl-pyridine dihydrochloride.

4. 2-methyl-3-amino-4,5-di-hydroxymethyl-pyridine dihydrobromide.

5. 2-methyl-3-amino-4,5-di-hydroxymethyl-pyridine sulfate.

6. A process which comprises reducing with lithium aluminum hydride a compound represented by the formula

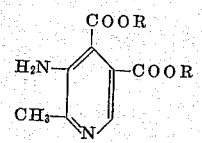

wherein R represents a member of the group consisting of alkyl and benzyl radicals, to produce a compound of the formula

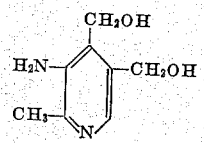

REUBEN G. JONES.

No references cited.